United States Patent
Wang et al.

(10) Patent No.: US 7,850,426 B2
(45) Date of Patent: Dec. 14, 2010

(54) CRIMPED CONNECTION FOR A COVER AND IMPELLER IN A TORQUE CONVERTER

(75) Inventors: Wei Wang, Irvine, CA (US); Nigel Gurney, Wooster, OH (US); Michael Van Sickle, Akron, OH (US); David Avins, Burbank, OH (US); Michael Buck, Buehl (DE); Christopher Hensel, Fredericksburg, OH (US); Aaron J. Schley, Canal Fulton, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 923 days.

(21) Appl. No.: 11/728,067

(22) Filed: Mar. 23, 2007

(65) Prior Publication Data

US 2007/0224046 A1    Sep. 27, 2007

Related U.S. Application Data

(60) Provisional application No. 60/785,692, filed on Mar. 24, 2006.

(51) Int. Cl.
*F01D 25/28* (2006.01)
(52) U.S. Cl. .............. 415/213.1; 415/215.1; 415/224; 416/180; 416/189; 416/197 C
(58) Field of Classification Search .............. 415/213.1, 415/215.1, 224; 416/180, 189, 197 C
See application file for complete search history.

(56) References Cited

U.S. PATENT DOCUMENTS

| | | | |
|---|---|---|---|
| 2,140,106 A | 12/1938 | Cox et al. | |
| 2,699,642 A * | 1/1955 | Ahlen | 60/912 |
| 2,745,354 A * | 5/1956 | English et al. | 416/180 |
| 2,903,910 A * | 9/1959 | Carnegie | 477/64 |
| 3,138,107 A | 6/1964 | Zeidler | |
| 3,250,222 A * | 5/1966 | Zeidler | 60/367 |
| 3,659,414 A | 5/1972 | Hause | |
| 5,465,575 A | 11/1995 | Shimmel | |
| 6,742,638 B2 | 6/2004 | Maienschein et al. | |
| 7,032,729 B2 | 4/2006 | Prater et al. | |
| 2006/0024161 A1 | 2/2006 | Ackermann | |
| 2006/0137954 A1 | 6/2006 | Prater et al. | |

FOREIGN PATENT DOCUMENTS

DE    1193757    5/1965

* cited by examiner

*Primary Examiner*—Igor Kershteyn
(74) *Attorney, Agent, or Firm*—Simpson & Simpson, PLLC

(57) ABSTRACT

The present invention broadly comprises a torque converter including a cover arranged to accept torque from a drive unit and an impeller. The cover and the impeller are joined by a crimped connection. In some aspects, the converter includes a sealing element disposed between the cover and the impeller and the sealing element is selected from the group consisting of an o-ring and a gasket. In some aspects, the cover is a cast piece. In some aspects, the cover is formed by a process selected from the group consisting of: molding, compression molding, and pressed metal forming. In some aspects, the cover is a stamped metal piece. The present invention also broadly comprises a torque converter including a cover, an impeller, and an induction brazed connection joining the cover and impeller. In some aspects, the cover further comprises axially disposed fingers engaged with the impeller.

18 Claims, 3 Drawing Sheets

CRIMPED CONNECTION FOR A COVER AND IMPELLER IN A TORQUE CONVERTER

CROSS-REFERENCE TO RELATED APPLICATIONS

This application claims the benefit under 35 U.S.C. §119(e) of U.S. Provisional Application No. 60/785,692 filed Mar. 24, 2006.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a cover and an impeller for a torque converter joined by a crimped connection.

BACKGROUND OF THE INVENTION

A cover and an impeller for a torque converter are typically connected by welding. However, the heat associated with welding can cause distortion of the cover or impeller and can result in leaking at the joint between the cover and impeller.

Thus, there is a long-felt need for a means of connecting a torque converter cover and impeller without causing distortion of the cover and impeller or leaking between the cover and impeller.

BRIEF SUMMARY OF THE INVENTION

The present invention broadly comprises a torque converter including a cover and an impeller. The cover is arranged to accept torque from a drive unit. The cover and the impeller are joined by a crimped connection. In some aspects, the converter includes a sealing element disposed between the cover and the impeller and the sealing element is selected from the group consisting of an o-ring and a gasket. In some aspects, the cover is a cast piece. In some aspects, the cover is formed by a process selected from the group consisting of: molding, compression molding, and pressed metal forming. In some aspects, the cover is a stamped metal piece.

The present invention also broadly comprises a torque converter including a cover arranged to accept torque from a drive unit, an impeller, and an induction brazed connection joining the cover and impeller. In some aspects, the cover further comprises axially disposed fingers engaged with the impeller.

It is a general object of the present invention to provide a torque converter with a connection between a cover and an impeller that is free of distortion caused by welding and other joining means.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
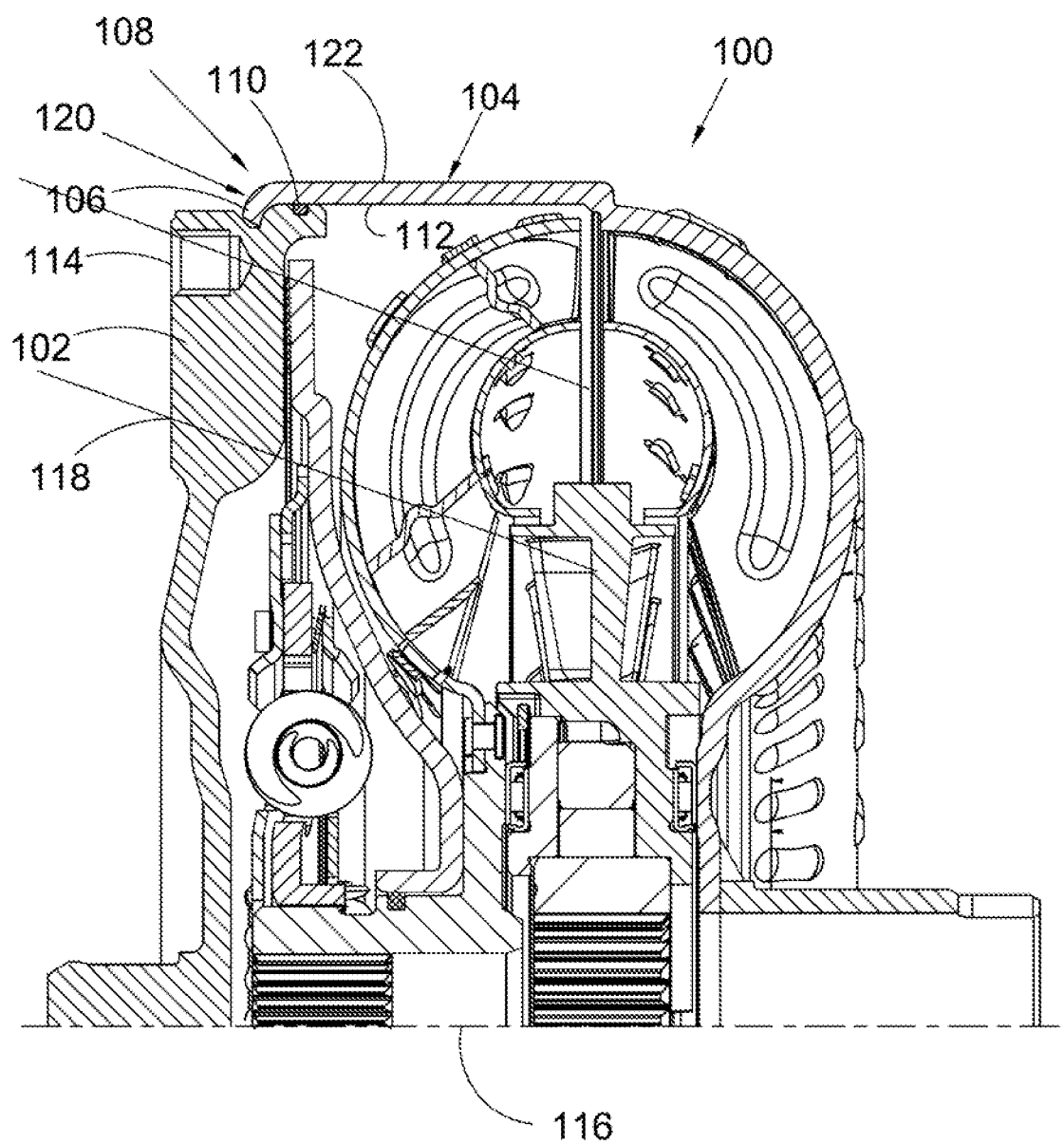
FIG. 1 is a partial cross-sectional view of a present invention torque converter with a cast cover.

FIG. 1 is a cross-sectional view of present invention torque converter 100 with cast cover 102. Torque converter 100 also includes impeller 104. Impeller 104 is formed by a metal fabricating process, such as stamping. Cover 102 is arranged to accept torque from a drive unit (not shown) and transfer the torque to impeller 104. Impeller 104 radially overlaps cover 102. Cover 102 and impeller 104 are joined by crimped connection 106 along joint 108. Any crimped connection known in the art can be used for connection 106. In FIG. 1, material forming impeller 104 has been manipulated to form the crimped connection. Connection 106 enables torque from the cover to be transferred to the impeller. That is, the connection fixedly secures the cover and the impeller, in particular, with respect to rotational movement.

In some aspects, converter 100 also includes sealing element 110 disposed between the cover and the impeller. Element 110 provides a liquid-tight seal between the cover and the impeller. Crimping the cover and the impeller at joint 108 maintains a compressive fit between element 110 and the cover/impeller. For example, connection 106 maintains radial force to compress inner face 112 of the impeller against element 110. By radial, we mean orthogonal to axis 116. Element 110 can be any sealing element known in the art, including, but not limited to an o-ring and a gasket.

Cover 102 in FIG. 1 is formed by metal casting. However, in some aspects, cover 102 is formed by other processes including, but not limited to molding, compression molding, and pressed metal forming. Any material known in the art can be used to form cover 102.

It should be understood that cast cover 102, impeller 104, and crimped connection 106 are not limited to any particular type, size, shape, or configuration. Further, the use of cover 102, impeller 104, and connection 106 with torque converters having sizes, shapes, configurations, and components different than those shown in FIG. 1 is within the spirit and scope of the invention as claimed.

Cover 102 includes at least one connection point 114 for connecting cover 102 to the drive unit. In general, points 114 are distributed circumferentially about axis 116. By circumferential, we mean at a certain radial distance from axis 116. In some aspects, connection points 114 are lugs as shown in FIG. 1. In some aspects (not shown), the connection points form protrusions on surface 118 or surface 118 is formed with indents proximate the connection points. Further, impeller 104 is formed with at least one axial extension (not shown). By axial we mean substantially parallel to axis 116. In general, the extensions are disposed about circumference 120 of the impeller. In some aspects, the extensions are in the form of fingers. The extensions extend beyond connection 106 toward axis 116. The extensions and connection points are in axial alignment. For those connection points with proximate indents, part of the extension is in the indent. In both cases, the extensions are braced against the cover, strengthening the rotational connection of the cover and impeller.

Figure 2:
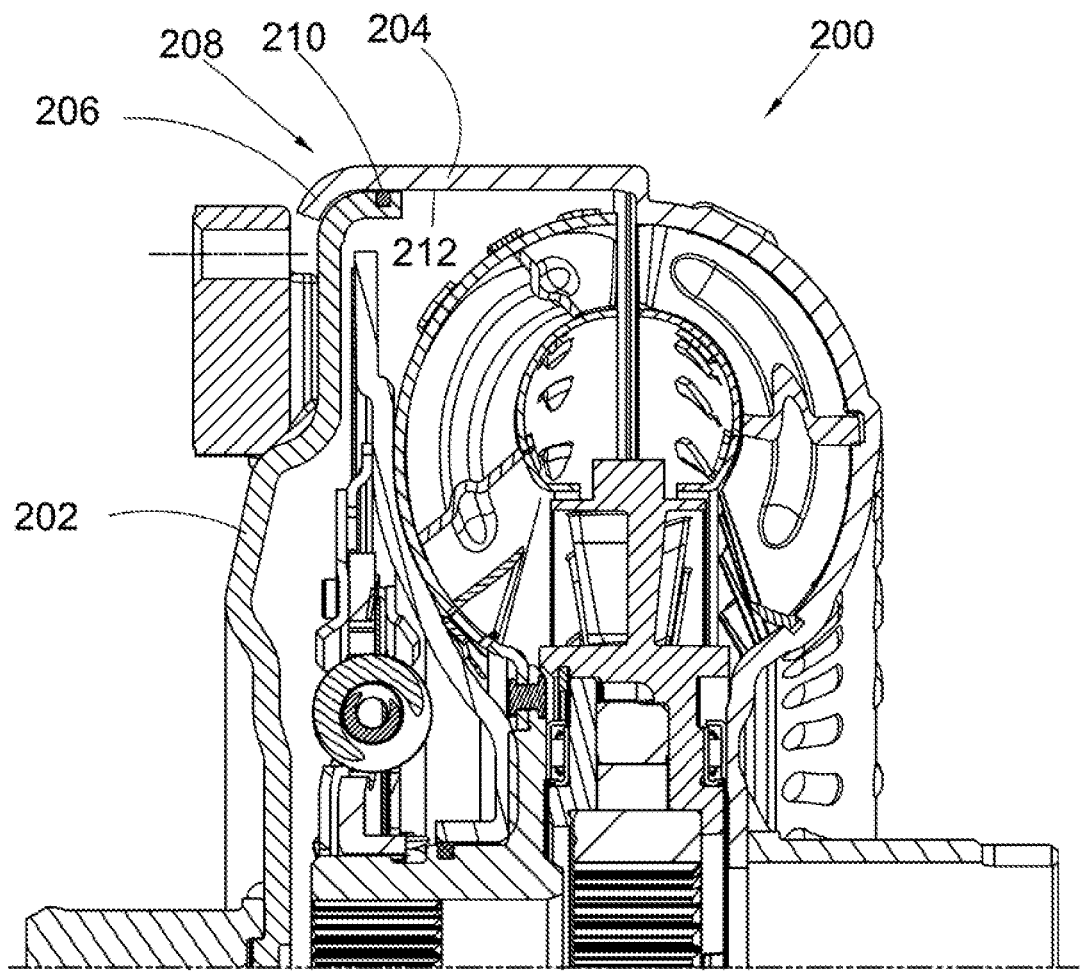
FIG. 2 is a partial cross-sectional view of a present invention torque converter with a stamped cover; and, FIG. 3 is a front view of a present invention torque converter with recesses and axial extensions.

FIG. 2 is a cross-sectional view of present invention torque converter 200 with cover 202. Torque converter 200 also includes impeller 204. Cover 202 and impeller 204 are formed by metal fabricating processes such as stamping. Cover 202 is arranged to accept torque from a drive unit (not shown) and transfer the torque to impeller 204. Cover 202 and impeller is 204 are joined by crimped connection 206 along joint 208. Material from one or both of cover 202 and impeller 204 can be manipulated to form the connection. In FIG. 2, impeller 204 radially overlaps the cover and material from the impeller has been crimped to form the connection. In some aspects (not shown), the cover radially overlaps the impeller. Connection 206 enables torque from the cover to be transferred to the impeller. That is, the connection fixedly secures the cover and the impeller, in particular, with respect to rotational movement.

In some aspects, converter 200 also includes sealing element 210 disposed between the cover and the impeller. Element 210 provides a liquid-tight seal between the cover and the impeller. Crimping the cover and the impeller at joint 208 maintains radial force to compress inner face 212 of the impeller against element 210. Element 210 can be any sealing element known in the art, including, but not limited to an o-ring and a gasket.

Any crimped connection known in the art can be used for connection 206. It should be understood that stamped cover 202, impeller 204, and crimped connection 206 are not limited to any particular type, size, shape, or configuration. Further, the use of cover 202, impeller 204, and connection 206 with torque converters having sizes, shapes, configurations, and components different than those shown in FIG. 2 is within the spirit and scope of the invention as claimed.

In some aspects (not shown), an impeller for a torque converter is formed by casting, a cover for the converter is formed by a metal fabricating process, such as stamping, and the cover and impeller are joined by a crimped connection. In these aspects, the material forming the cover is crimped. In some aspects, a sealing element is placed between the cover and impeller. In general, the descriptions for FIGS. 1 and 2 are applicable to a torque converter with a cast impeller and fabricated metal cover.

In some aspects (not shown), at least one of the cover and impeller for a torque converter is formed by metal casting and the cover and impeller are joined by a brazed connection. That is, either or both of the cover and impeller are formed by casting. Returning to FIG. 1, the use of a brazed connection facilitates the positioning of the joint, between the cover and the impeller, closer to the impeller, reducing the axial length of segment 122 of the impeller. This is particularly advantageous when the impeller is stamped, as forming radial walls for stamped components increases the difficulty of the stamping process.

Figure 3:
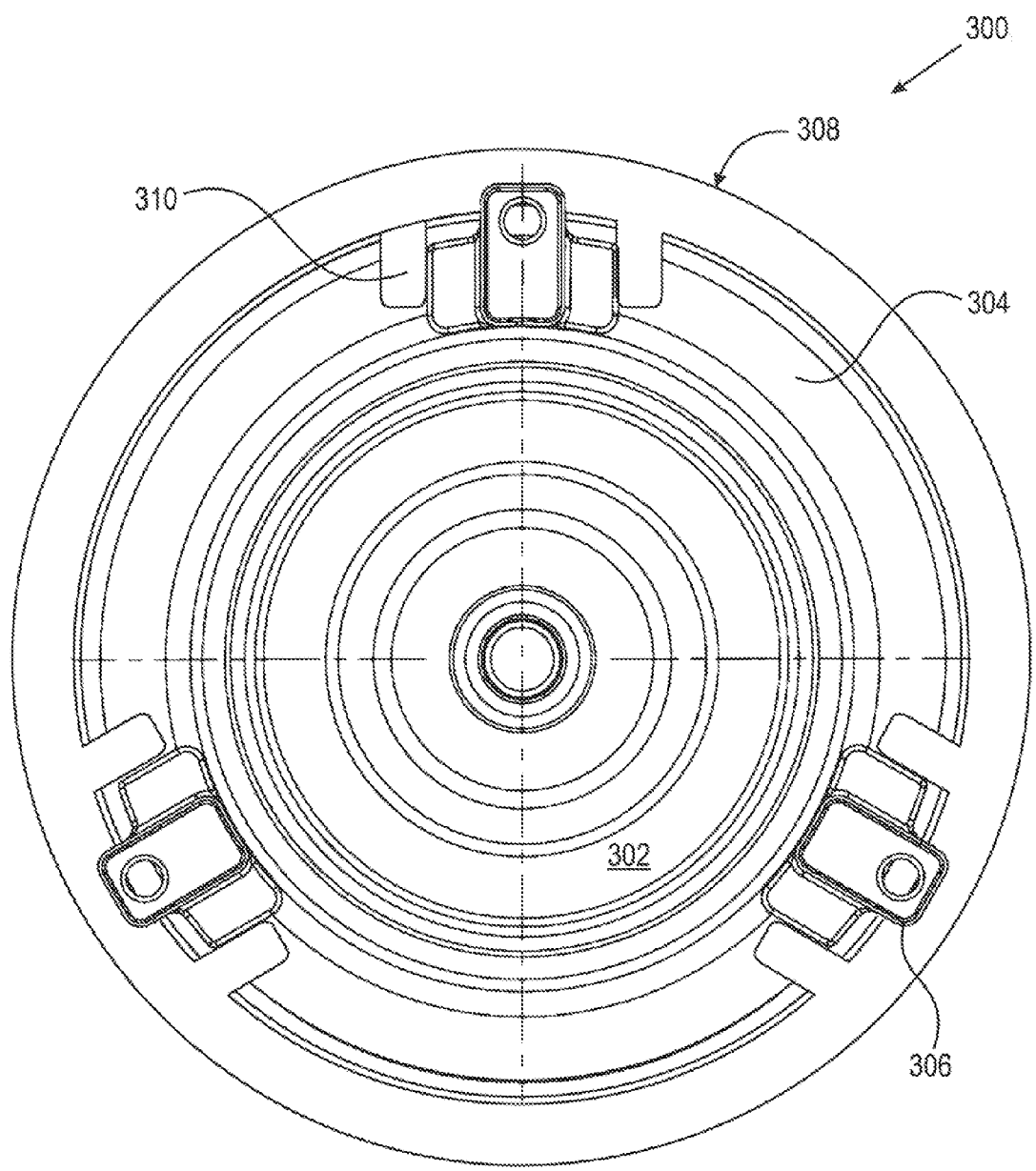

FIG. 3 is a front view of present invention torque converter 300 with recesses and axial extensions. In some aspects, the cover or the impeller is formed with at least one axial extension and the other of the cover or impeller is formed with at least one recess. In FIG. 3, torque converter 300 is shown with cover 302 having recesses 304 and connection points 306. The torque converter also includes impeller 308 having axial extensions 310. Extensions 310 are in contact with points 306 and disposed in recesses 304. An embodiment with the cover having the axial extensions and the impeller having the recesses is not shown. The extensions and recesses are complimentary such that respective extensions fit in or are disposed in respective recesses, for example, complimentary fingers and notches. The cover or impeller formed with the recesses is cast. The cover or impeller formed with the extensions can be cast or can be formed by another metal fabricating process, such as stamping. The joint formed between the cover and impeller is brazed. Any brazing means known in the art, including, but not limited to induction brazing can be used. The extensions and recesses serve to transfer rotational torque. The brazing provides an axial bond and serves to seal the connection between the cover and the impeller.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A torque converter, comprising:
    a lock up clutch;
    a cover arranged to accept torque from a drive unit; and,
    an impeller, wherein:
        said cover and said impeller are joined by a crimped connection;
        the cover includes a radially outwardly facing surface in contact with the impeller and including a groove;
        an axial end of the impeller is disposed in the groove;
        the axial end of the impeller is at a uniform distance from an axis of rotation for the torque converter;
        the impeller exerts a force radially inwardly on the cover;
        the cover and impeller are free of a weld connecting the cover and the impeller;
        the cover includes a segment disposed radially inward of the crimped connection and extending axially away from the impeller and axially beyond the crimped connection;
        the cover includes a plurality of connection points for connecting the cover to the drive unit;
        the plurality of connection points are at least partially disposed, in a radial direction, between the lock up clutch and the groove; and,
        the cover, the segment, and the connection points are formed of a single piece of material.

2. The torque converter of claim 1 further comprising: a sealing element disposed between said cover and said impeller.

3. The torque converter of claim 2 wherein said sealing element is selected from the group consisting of an o-ring and a gasket.

4. The torque converter of claim 1 wherein said impeller axially overlaps said cover at said crimped connection.

5. The torque converter of claim 1 wherein said cover axially overlaps said impeller at said crimped connection.

6. The torque converter of claim 1 wherein said cover is manipulated to form said crimped connection.

7. The torque converter of claim 1 wherein said impeller is manipulated to form said crimped connection.

8. The torque converter of claim 1 wherein said cover is formed by casting.

9. The torque converter of claim 1 wherein said cover is formed by a first process selected from the group consisting of: molding, compression molding, and pressed metal forming.

10. The torque converter of claim 1 wherein said cover is formed by stamping.

11. The torque converter of claim 1 wherein said impeller is formed by casting.

12. The torque converter of claim 1 wherein said impeller is formed by a second process selected from the group consisting of: molding, compression molding, and pressed metal forming.

13. The torque converter of claim 1 wherein said impeller is formed by stamping.

14. The torque converter of claim 1 wherein said impeller further comprises at least one axial extension, and said at least one axial extension is in contact with said at least one connection point.

15. A torque converter, comprising:
a cover arranged to accept torque from a drive unit and including a plurality of connection points for connection to a drive unit; and,
an impeller including a plurality of axial extensions, wherein:
said cover and said impeller are joined by a crimped connection;
said cover is formed by casting and includes a plurality of recesses; and,
the plurality of axial extensions is disposed in the plurality of recesses and is in contact with the plurality of connection points.

16. The torque converter of claim 15 wherein said impeller is formed by casting.

17. The torque converter of claim 15 wherein said cover further comprises at least one first axial extension, said impeller is formed by casting and includes at least one first recess, and said at least one first axial extension is disposed in said at least one first recess.

18. A torque converter, comprising:
a lock up clutch;
a cover arranged to accept torque from a drive unit; and,
an impeller, wherein:
the cover includes a radially outwardly facing surface in contact with the impeller and including a groove;
an axial end of the impeller is disposed in the groove;
the cover includes a plurality of connection points for connecting the cover to the drive unit;
the plurality of connection points are at least partially disposed, in a radial direction, between the lock up clutch and the groove; and,
the cover and the connection points are formed of a single piece of material.

\* \* \* \* \*